United States Patent [19]
Gonze et al.

[11] Patent Number: 5,444,976
[45] Date of Patent: Aug. 29, 1995

[54] CATALYTIC CONVERTER HEATING

[75] Inventors: Eugene V. Gonze, Sterling Heights; David B. Brown, Shelby Township, both of Mich.

[73] Assignee: General Motors Corporation, Detroit, Mich.

[21] Appl. No.: 266,394

[22] Filed: Jun. 27, 1994

[51] Int. Cl.$^6$ .............................................. F01N 3/20
[52] U.S. Cl. ................................. 60/274; 60/284; 60/286; 60/303
[58] Field of Search ............... 60/274, 276, 277, 284, 60/303, 286, 300

[56] References Cited

U.S. PATENT DOCUMENTS

| | | | |
|---|---|---|---|
| 172,779 | 12/1893 | Ament | 60/274 |
| 3,392,522 | 7/1968 | Haas | 60/284 |
| 4,383,411 | 5/1983 | Riddel | 60/303 |
| 4,677,823 | 7/1987 | Hardy | 60/274 |
| 4,840,028 | 6/1989 | Kusada | 60/303 |
| 5,193,340 | 3/1993 | Kamihara | 60/286 |
| 5,277,025 | 1/1994 | Gonze | 60/274 |
| 5,320,523 | 6/1994 | Stark | 60/303 |
| 5,390,488 | 2/1995 | Ament | 60/274 |

*Primary Examiner*—Ira S. Lazarus
*Assistant Examiner*—Daniel J. O'Connor
*Attorney, Agent, or Firm*—Michael J. Bridges

[57] ABSTRACT

Electrically heated catalytic converter power control to minimize automotive vehicle electrical system burden monitors the performance of an electrical heater in elevating catalytic converter temperature and periodically adjusts the electrical power applied to the heater to the minimum necessary to provide for heating performance within specification, so as to elevate the catalytic converter to light-off within a specified period of time following an engine coldstart.

13 Claims, 4 Drawing Sheets

CATALYTIC CONVERTER HEATING

FIELD OF THE INVENTION

The present invention relates to internal combustion engine emissions control and, more specifically, to control of catalytic converter heating.

BACKGROUND OF THE INVENTION

Effective reduction of undesirable internal combustion engine emissions, such as hydrocarbon, carbon monoxide, and oxides of nitrogen is provided through catalytic treatment of engine exhaust gas. Efficient catalytic treatment may be provided by passing engine exhaust gas through a catalytic converter which becomes catalytically active when heated, such as through heat energy transfer from engine exhaust gas, to light-off temperature, typically about 400 degrees Celsius.

It is known to apply supplemental heating to the converter or to the exhaust gas entering the converter to reduce the time to light-off following an engine cold-start. Electrical heating elements have been used as supplemental converter heaters in which a catalyzed electrical heating element is located close to or is integral with a low mass highly catalyzed surface to rapidly heat the element and surface to light-off. The element and surface are located upstream of the catalytic converter in the engine exhaust gas path. Once the element and the surface reach light-off temperature, engine exhaust gas products combined with a supply of oxygen will oxidize when passing thereby, releasing significant amounts of energy, which are passed to the catalytic converter and rapidly elevate the temperature thereof to light-off. Indeed, the energy released through this exothermic reaction rapidly increases to levels overwhelming the level of heat energy released by the electrical heating element. Accordingly, the element may be turned off shortly after the catalyst reaches light-off without materially affecting the time to light-off of the converter itself.

Over time, the catalyzed surface may tend to deteriorate in performance. Carbon passing through the engine exhaust gas path may impact the surface, disturbing the catalyst that is disposed thereon. Engine oil contaminants, such as phosphorus and zinc, may poison the catalyst, reducing its efficiency. It is difficult to predict the rate of deterioration in performance of the catalyst on the surface, as the behavior of the phenomena causing the deterioration is often not predictable. For example, the frequency that carbon particles impact the catalyzed surface is difficult to predict. Furthermore, the effect that any such impact may have on performance of the catalyst is extremely difficult to estimate.

What is known is that when such deterioration occurs, electrical power required for proper catalytic converter pre-heating will increase. For example, more power may be required to rapidly heat the catalyzed surface to light-off. In more advanced cases of catalyzed surface deterioration, the heating element may play a significant role in directly heating the catalytic converter itself—dramatically increasing its power requirement.

The significant power required to drive the electrical heating element of an electrically heated catalytic converter EHC significantly impacts the electrical system of the vehicle to which it is applied. Vehicle power supply limitations make it desirable to limit the power supplied to the electrical heating element of the EHC to the minimum power needed to elevate the converter to light-off in a desired time. This minimum power may be initially small for an undamaged catalyzed surface, but may increase substantially and unpredictably as the surface deteriorates.

Accordingly, it would be desirable to accurately estimate the minimum power needed to rapidly elevate the temperature of a catalytic converter to light-off in an EHC system, and to control the power provided the EHC in response to the estimation to minimize EHC power requirements while preserving the emissions benefit of the EHC.

SUMMARY OF THE INVENTION

The present invention addresses the presented need by accurately estimating the performance of the catalyzed surface in an EHC as an indication of the energy released thereby, and adjusts power applied to the electrical heating element of the EHC in response to the indication to provide for rapid heating of the converter to light-off with minimum power requirements.

More specifically, direct measurement of a parameter that indicates EHC performance, such as the time rate of change in catalyst temperature, is fed back for comparison to a target performance threshold. The power provided to the EHC is minimized through periodic adjustment to maintain the EHC performance substantially at the target performance threshold. Any minimum power adjustments are learned for application in subsequent EHC operating cycles.

In the event the EHC is performing within the target performance threshold as determined through comparison of the actual performance with the target, a reduction in EHC power is provided and is learned for future EHC operating cycles. If the EHC is not performing within the target threshold, an increase in EHC power is provided and is likewise learned. The performance measure is periodically repeated during EHC operating cycles, making the compensation responsive to changing power requirements of the EHC.

The impact of the EHC power requirement on the vehicle power supply is thus minimized despite potentially significant changes in EHC power requirements over the life of the EHC, without compromising EHC performance in heating the catalytic converter. The modelling difficulties associated with deterioration of the catalyzed surface in the EHC are avoided through direct measurement of a parameter indicating that deterioration.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
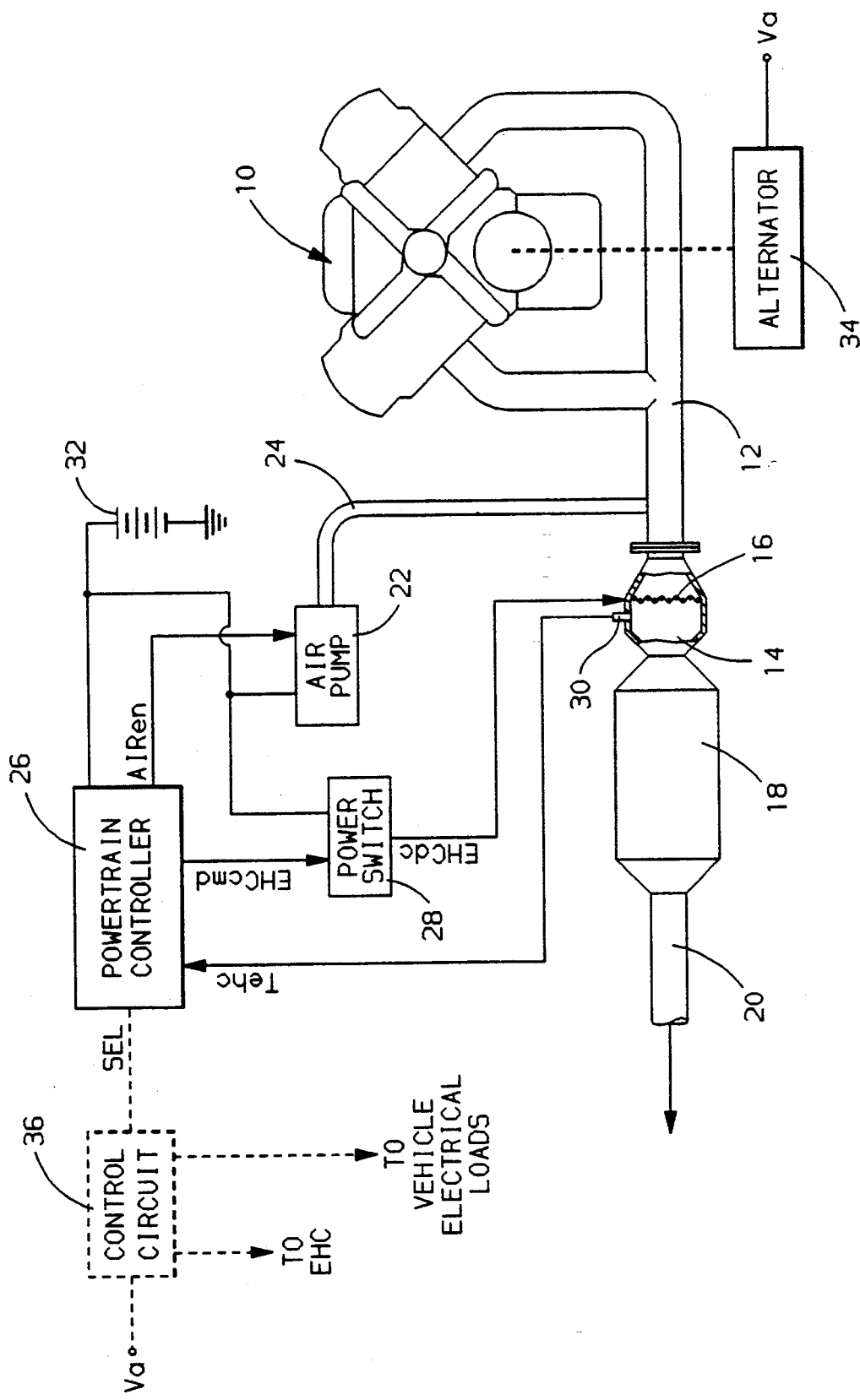
FIG. 1 is a general diagram of the hardware used to carry out the preferred embodiment of this invention.

Referring to FIG. 1, exhaust gas produced through operation of engine 10 is passed through conventional exhaust gas conduit 12 to two stage catalytic converter 18 for catalytic treatment therein. Supplemental catalytic converter heating is provided by heating element 16, which may be a conventional electrical heating element, such as electrically resistive strips or grids deposited on structural support means. The strips or grids may be catalyzed or inert. Heat energy from element 16 is passed to highly catalyzed surface 14 substantially adjacent to the heating element 16 and downstream thereof wherein downstream in this embodiment is defined using the normal direction of flow of exhaust gas from the engine 10 through the exhaust gas conduit 12. The element 16 may be integral with the surface 14 and both may be highly catalyzed.

Catalytic converter 18 is provided substantially next to catalyzed surface 14 on the downstream side thereof in the exhaust gas path in position that engine exhaust gas passes through conduit 12, past heating element 16 and the catalyzed surface 14 and to catalytic converter 18 for catalytic treatment therein. The treated engine exhaust gas exits the converter 18 via tailpipe 20.

A supply of air is provided to be combined with engine exhaust gas by operation of conventional air pump 22 which so operates when input command signal AIRen is at an enable level, such as a high voltage level so that air is passed to exhaust gas conduit 12 and combined with engine exhaust gas upstream of the heating element 16. A mixture of oxygen-rich fresh air from pump 22 and engine exhaust gas is passed to the heating element 16 and then to the catalyzed surface 14, to support oxidization of engine exhaust gas elements passing the surface.

Temperature sensor 30, such as conventional thermistor or other known resistive type temperature sensing element is disposed in proximity to catalyzed surface 14 or to catalytic converter 18 to sense the temperature of the surface or the converter or indeed of any hardware that may reflect the heating of the converter or of the catalyzed surface. Sensor provides an output signal Tehc indicative of the temperature of the surface 14 or of the catalytic converter 18.

Powertrain controller 26, such as a conventional single chip microcontroller, provides supplemental catalytic converter heating control in accord with this embodiment. Additionally, powertrain controller 26 may control general powertrain operations, such as by controlling fuel, air, and ignition commands to the engine 10, and by carrying out engine diagnostic and maintenance routines consistent with well-established practice. Such operation may be provided through execution of engine control routines stored in controller memory (not shown) which may direct the reading of input signal information and the generation and issuance of actuator commands in response to the input signal information.

Powertrain controller 26 generates output signal AIRen to drive air pump 22 in a manner contributing to engine emissions reduction. AIRen may be a voltage drive signal the magnitude of which corresponds to the level of output desired of air pump 22. Powertrain controller 26 may also output control signal EHCcmd in proportion to the desired power output of heating element 16, as determined through controller operations yet to be described. The command EHCcmd is provided to power switch 28, which may be any conventional high current drive hardware capable of modulating the level of average d.c. current passed to the heating element 16. For example, power switch may include one or more FETs, rated for high current application, disposed between a supply voltage and the heating element. A gate controller may receive the signal EHCcmd and pulse width modulate the FET or FETs of the power switch 28 by applying an enable voltage to the gate or gates thereof during an on time, to allow for a connection between the supply voltage and the heating element 16. The gate or gates would be turned off for a disable period, to remove the supply voltage from the heating element 16. In this manner, the average power to the heating element 16 may be precisely controlled by varying the duty cycle of the signal applied to the gate of the FET or FETs, wherein a high degree of power control resolution is achieved in accord with this invention.

The signal EHCdc is output by the power switch to the heating element 16 in the form of a switched supply voltage or other equivalent controlled power signal to provide for control of heating element power output. A voltage source 32, such as a conventional vehicle battery, provides supply voltage to the controller 26, the air pump 22, the power switch 28, and to other electrical devices requiring such a signal in accord with generally understood powertrain operation.

Conventional alternator 34 is driven by an engine output shaft to generate output voltage Va substantially in proportion to the rate of rotation of the output shaft or, in other words, substantially in proportion to engine speed. Output voltage Va is provided to control circuit 36, which may include a number of conventional current drivers controlled by the signal SEL from powertrain controller 26 for driving a number of electrical loads. The voltage Va is selectively applied to one or more vehicle electrical loads depending on the state of the signal SEL. For example, Va may be applied to power switch 28 when SEL is provided in a predetermined state, or may be applied to other vehicle electrical loads for other SEL states.

In the embodiment of this invention in which Va is applied to power switch 28, the voltage source 32 would not be connected thereto, so that the sole voltage source applied to power switch 28 is from the alternator 34, such as in an unregulated form. In such case, the power switch would be configured to pass the unregulated voltage directly to the EHC, rather than in the form of a duty cycle, wherein the voltage applied to the EHC would then be adjusted in accord with this invention by varying proportionately the engine speed.

Figure 2:
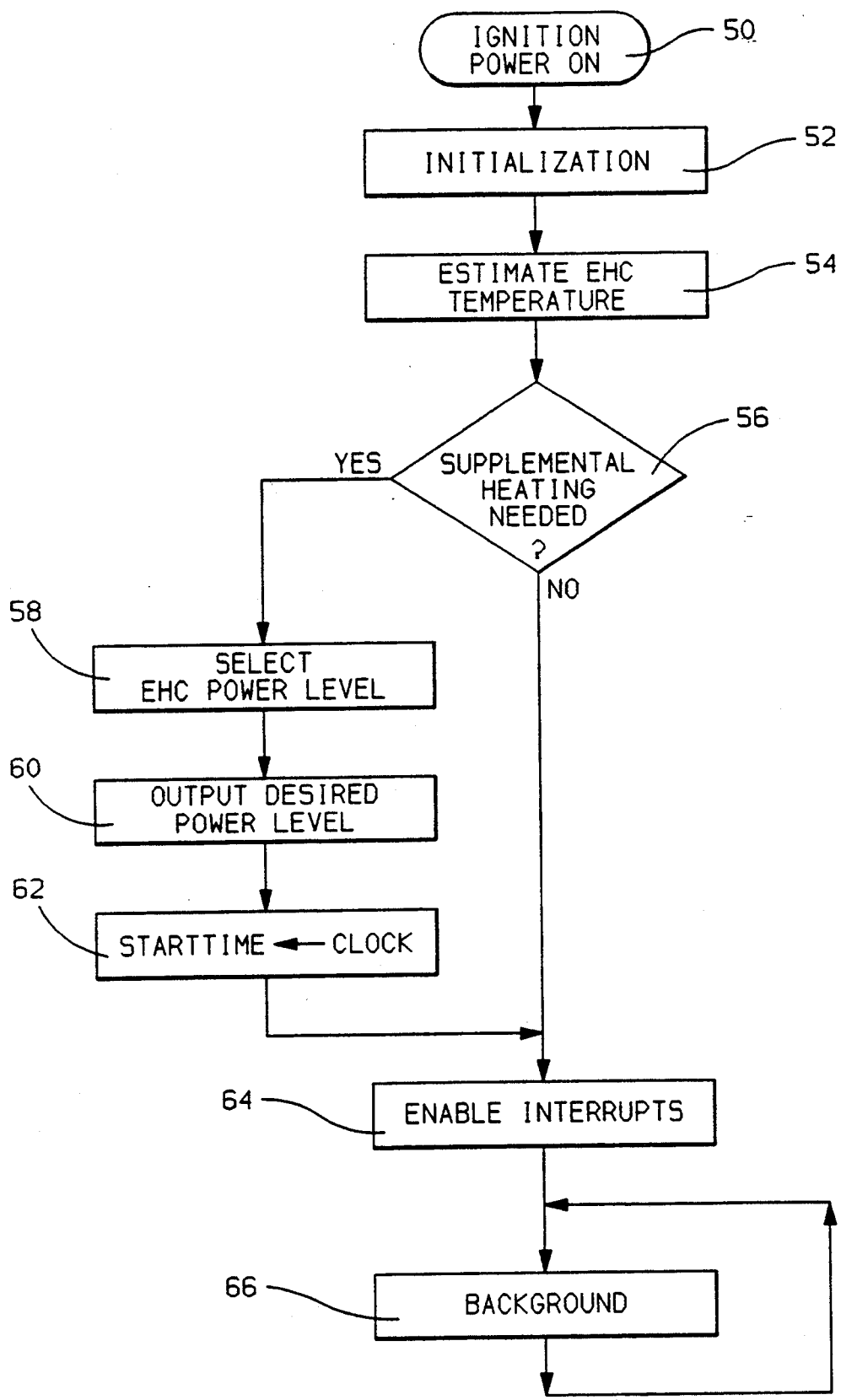
FIGS. 2–4 are computer flow diagrams illustrating the steps used to carry out this invention in accord with the preferred embodiment and with the hardware of FIG. 1.
Figure 3:
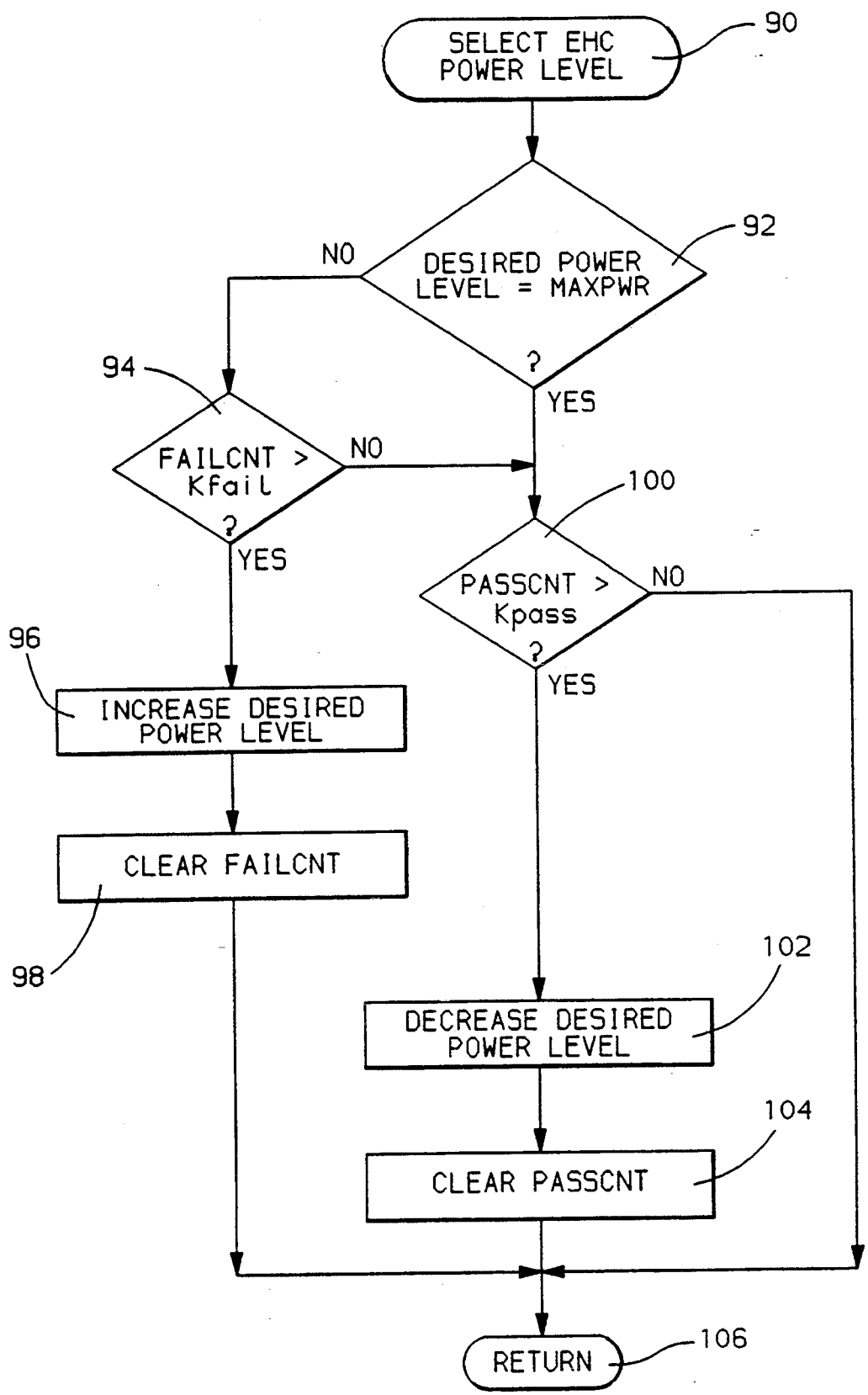
Figure 4:
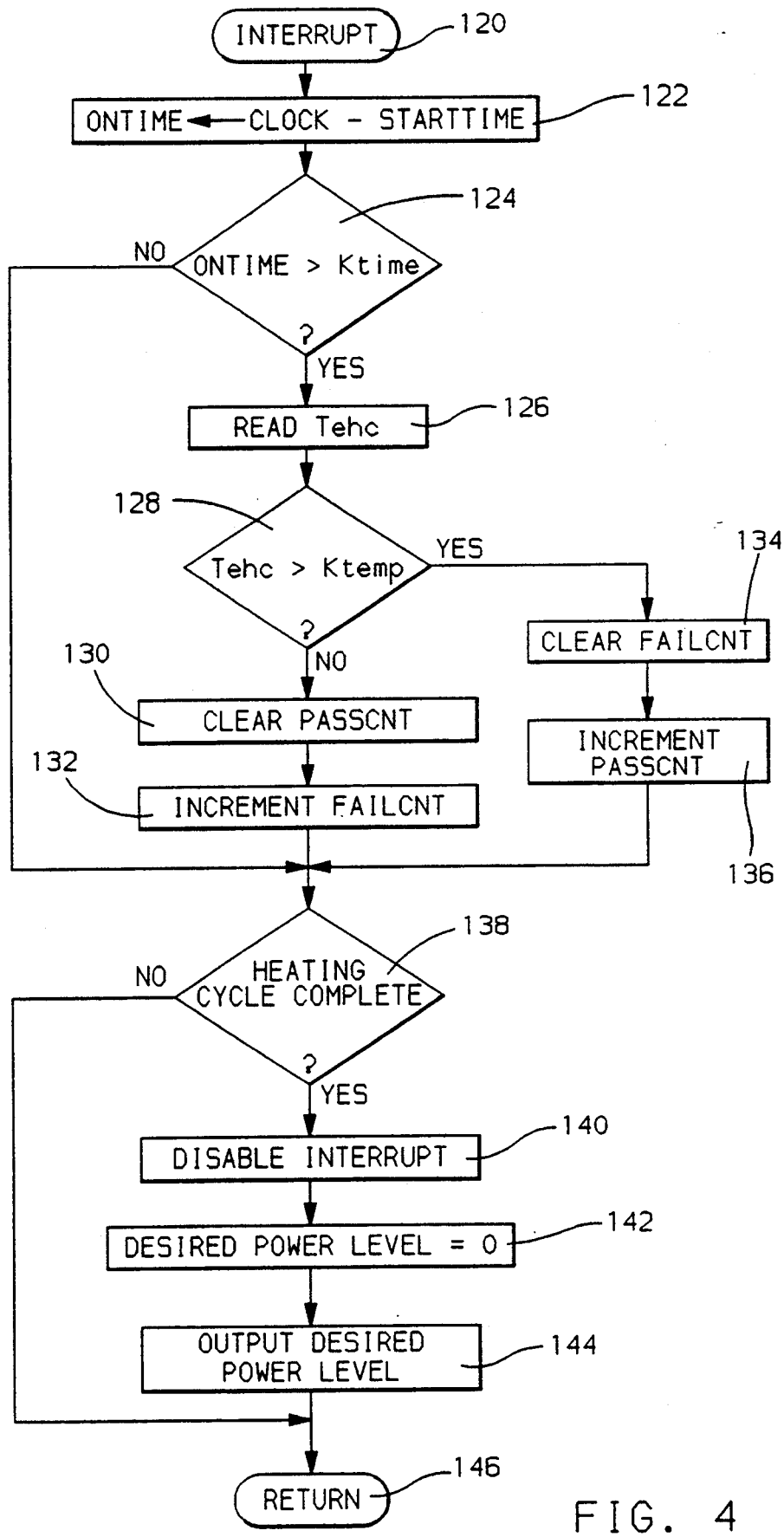

The routines to carry out supplemental converter heating in accord with this embodiment are illustrated in FIGS. 2-4. Other routines may also be included in controller memory for execution while the controller is active, such as conventional engine control, diagnostic, and maintenance routines.

Upon application of ignition power Vign to controller 28, such as when a vehicle operator rotates an ignition key to its on position, the routine of FIG. 2 is executed starting at a step 50, and moving to a step 52 at which controller initialization operations take place which may include setting data variables, pointers, flags, and counters to initial values. Included in this initialization step is the powertrain controller 26 function of transmitting output signal AIRen to the air pump 22 (FIG. 1), wherein the form or voltage level of AIRen is such that air pump will respond to that form or voltage level by initiating its pumping operation so as to inject fresh air to the exhaust gas conduit 12, to support conversion of engine exhaust gas elements as is well known in the art. For example, the control of air pump 22 may be provided as described in copending application Ser. No. 08/172,779, filed Dec. 27, 1993, assigned to the assignee of this invention. The command to activate the air pump 22, such as command AIRen in this embodiment, may stay high while converter heating is ongoing, and then may drop low, as described in the cited copending application.

The routine next estimates the temperature of the EHC at a step 54. The estimate may be derived from a reading of temperature sensor 30 (FIG. 1), or from a measure of the time the vehicle has been turned off. An EHC temperature profile as a function of the amount of time since the engine was stopped may be calibrated, stored, and referenced at the step 52 using the engine stop time to estimate EHC temperature.

The routine moves from the step 54 to a step 56 to determine if supplemental heating of the converter 18 (FIG. 1) is needed. For example, in this embodiment, supplemental heating is needed if the converter temperature is well below the light-off temperature of about 350 degrees Celsius. This may correspond to the engine being off for a predetermined time period, such as at least one hour. If supplemental heating is needed, the routine selects an EHC power level at a step 58, by executing the steps illustrated in FIG. 3, to be described. Generally, in accord with this invention, the EHC power level will normally be at a minimum setting, such as corresponding to 1.5 kW dissipated in the EHC, when the EHC is operating in an undeteriorated condition, but may be adjusted away from that initial setting through the steps of FIG. 3.

The selected power level is next output by the powertrain controller 26 in the form of an electrical signal EHCcmd to the power switch 28 (FIG. 1) at a step 60. The magnitude of the electrical signal EHCcmd indicates the desired power output of the electrical heating element 16 (FIG. 1), and is converted by the power switch 28 into a duty cycle command EHCdc with which to apply supply voltage across the heating element, as described. In alternative embodiments within the scope of this invention, EHCcmd may be used in the generation of other drive signals for application to the conventional heating element 16, wherein EHCcmd is interpreted by the power switch 28, or other drive circuitry capable of driving a conventional heating element, and used in the generation of a drive signal for the element to regulate the power output of the element.

After outputting the desired power level, which is substantially zero when the EHC is not active, the present value of CLOCK, the powertrain controller real time clock (not shown) is stored in controller memory as STARTTIME at a step 62, indicating the time of the start of EHC heating for the present heating cycle. Next, or if supplemental heating was determined to not be needed at the step 56, controller interrupts are enabled at a step 64. The interrupts may be event-based or time-based, as may be required in the conventional operation of the controller, and as is generally understood in the art. Included in the enabled interrupts is a time-based interrupt set up to occur approximately every 100 milliseconds in which a variety of generally known operations may occur. In the present embodiment, EHC control operations are included in the service routine of this interrupt, as will be described in the routine of FIG. 4.

Background operations are next carried out at a step 66, which is continuously repeated while the powertrain controller is operating. The background operations include continuously executed albeit relatively low priority control, diagnostic, and maintenance operations that may be used in accord with generally understood controller-based powertrain control. The background operations may be interrupted upon the occurrence of the interrupts enabled at the step 64, for time or event-based powertrain control operations.

FIG. 3 illustrates the steps used in the present embodiment to select an EHC power level so as to carry out the function of the step 58 of the routine of FIG. 2. When the step 58 is executed, the routine of FIG. 3 is called into execution starting at a step 90 and proceeding to a step 92 to compare the most recent stored desired power level to a maximum power level for the present application MAXPWR. The desired power level is initialized to a low power value, such as equivalent to 1.5 kW output by the heating element 16 (FIG. 1), when the catalyzed surface 14 is not yet used. The low power level corresponds to the high efficiency of the surface 14 wherein the surface temperature may be rapidly elevated to light-off, and the exothermic reaction supported thereby with passing engine exhaust gas elements releases sufficient energy to elevate the catalytic converter 18 (FIG. 1) to light-off within a preferred time interval, such as approximately fifteen seconds.

The initialization of the desired power level to a low power level may occur during or after vehicle assembly, or after the catalyzed surface 14 is placed in the system. Returning to FIG. 3, if the stored desired power level is at the MAXPWR level, indicating that the heating element 16 is being operated at maximum output power level, such as 3 kW, the steps 100-104 are executed to determine if the power level can be lowered while still providing sufficient catalytic converter heating in accord with a corresponding design constraint for the EHC. Specifically, a value PASSCNT is compared to a pass threshold Kpass, set to twenty in this embodiment. PASSCNT is a count of the number of consecutive converter heating cycles in which the power applied to the heating element was determined to be sufficient. In other words, for the present desired power level, PASSCNT will be incremented each time the converter heats up rapidly enough to satisfy a predetermined heating design goal, as determined through the routine of FIG. 4 of the present embodiment and in accord with the present invention. If PASSCNT is incremented to a value greater than Kpass as determined at the step 100, it is assumed the desired power level may be reduced without taking the performance of the EHC outside of the predetermined heating design goal, and the step 102 is executed at which the desired power level is reduced.

This reduction, in a first embodiment of this invention, is carried out by reducing the magnitude of EHCcmd issued to the power switch 28, so as to result in a proportionate decrease in the duty cycle of the signal EHCdc. In an alternative embodiment within the scope of this invention in which alternator output voltage Va is applied as the power source to heating element 16, the reduction may be carried out by commanding a decrease in engine speed so as to decrease proportionately the output voltage magnitude Va, which is applied directly to the heating element 16. The amount of the engine speed decrease needed to arrive at the desired power reduction to the heating element 16 may be predetermined in a conventional calibration process in which the relationship of an amount of change in engine speed to an amount of change in Va is determined. The reduction in engine speed may be provided by changing a set point engine speed command value in powertrain controller memory, used by the controller 26 as a desired engine speed for conventional engine idle speed control.

The desired power level may be reduced a fixed amount from its current value, or may be reduced by an amount that varies as a function of the EHC performance. For example, the amount of the reduction may be proportional to the degree by which the EHC exceeds its predetermined heating goal. In the present embodiment, the amount of the reduction is substantially fixed, wherein the desired power level is reduced by about fifteen percent of its current value at the step 102. After decreasing the desired power level which is stored as the new desired power level, the value PASSCNT is cleared at the step 104 in preparation for an analysis of the EHC performance under the new power level.

Next, or if PASSCNT did not exceed Kpass at the step 100, the routine returns to the calling step 58 of FIG. 2, via a step 106. Returning to the step 92, if the desired power level is not substantially equal to MAXPWR, the routine moves to a step 94 to compare FAILCNT to Kfail. FAILCNT represents a count of the number of consecutive EHC heating cycles at the current desired power level in which the performance of the EHC was determined through the routine of FIG. 4 to be insufficient to adequately heat the catalytic converter 18 (FIG. 1). In other words, if the heating element 16 (FIG. 1), when driven at the desired power level, fails to elevate the catalytic surface 14 temperature or the catalytic converter 18 temperature to light-off within a predetermined time period, a heating failure may be assumed. The routine of FIG. 4 describes an approach to estimating when such a failure has occurred. Under such a failure condition, FAILCNT is incremented. 1.5 If FAILCNT exceeds Kfail, which is calibrated as one in this embodiment, more power is assumed to be needed to provide for adequate catalytic converter heating, and the routine of FIG. 3 provides for an increase in the desired power level at a step 96, for example by increasing EHCcmd by a fixed amount, such as about twenty percent of its prior value in this embodiment, the magnitude of EHCcmd being issued by the powertrain controller 26 to the power switch 28 (FIG. 1), to result in a proportionate change in EHCdc. As described in the adjustment of the desired power level at the step 102 of FIG. 3, other approaches may be used to adjust the desired power level. For example, the amount of the adjustment at the step 96 may be determined as a predetermined function of the degree of the failure to provide for adequate heating, with a larger increase in the power level used for a more significant degree of failure.

In the embodiment of this invention in which power is provided to the heating element 16 via the alternator output voltage Va, the power increase of step 96 may be provided by increasing commanded engine idle speed through change in an idle speed set point command in powertrain controller 26. The increase in engine speed should be calibrated to correspond to the desired increase in power to the heating element 16. After increasing the desired power level, the count value FAILCNT is cleared to zero at a step 98, so that a new count may be provided at the next power level. Next, the routine returns to the operations of the routine of FIG. 2, via the step 106, as described. Returning to the step 94, if FAILCNT does not exceed Kfail, an increase in the desired power level is assumed to be unnecessary, and the routine moves to the described step 100, to determine if a decrease in the desired power level may be made without sacrificing EHC performance, as described.

Upon the occurrence of the time-based interrupt set up to occur approximately every 100 milliseconds in this embodiment and enabled at the step 64 of the routine of FIG. 2, controller operations vector to the interrupt service routine generally illustrated in FIG. 4, starting at a step 120, and proceeding to a step 122 at which ONTIME is determined as the difference between the present value of the controller real-time clock CLOCK and the stored value STARTTIME. ONTIME therefore roughly represents the amount of time the EHC has been operating in the present heating cycle ultimately to elevate the catalytic converter temperature to light-off, as described.

The determined ONTIME is next compared to a threshold value Ktime at a step 124, wherein Ktime represents a calibrated threshold period of time during which a predetermined degree of temperature elevation in the catalyzed surface should have occurred. If such an elevation has not occurred within a period Ktime of energization of the heating element 16, then a predetermined heating goal will likely not be met, and a failure has occurred. Alternatively, if the elevation has occurred within Ktime, the predetermined heating goal likely will be met and no failure has occurred. In this embodiment Ktime is set to about ten seconds, and the corresponding temperature threshold Ktemp, to be described, is set to approximately 350 degrees Celsius.

Returning to FIG. 4, if ONTIME exceeds Ktime at the step 124, a heating performance test is performed in this embodiment by moving to the steps 126–136. First, a temperature value Tehc is read at a step 126. Tehc corresponds to the output of sensor 30 (FIG. 1) which, as described, is strategically located in proximity to the catalyzed surface 14 or to the catalytic converter 18 so as to provide an indication of the heating performance of the EHC including the heating element 16 and the catalyzed surface 14. In this embodiment, sensor 30 is located close to the catalyzed surface 14 so as to indicate how rapidly it is responding to the energy transferred to it from the heating element 16. However, the sensor 30 may be placed in a variety of locations in accord with this invention, providing the temperature sensed at that location indicates the performance of the heating element 16, operating at the desired power level, in supporting a rapid elevation of the catalytic converter temperature to light-off temperature.

For example, the sensor 30 may be located close to or on the catalytic converter 18 itself and provide the necessary temperature sensing function supporting the present invention. In such an embodiment, the temperature of the EHC, such as the catalyzed surface 14 thereof may be estimated using the catalytic converter temperature as a base temperature, and adding to the base temperature an estimated change in temperature $\Delta T$. The estimated change in temperature $\Delta T$ may be estimated as follows $$\Delta AT = E/M - \text{HEAT LOSS}$$

in which M is the EHC mass, a known constant, HEAT LOSS is a calibratable value representing exhaust energy passed through and not absorbed in the EHC, and E is energy output by the heating element 16 during the present heating cycle, which may be represented as $$E = V*I*t$$

in which V is the average drive voltage applied across the heating element 16, I is the average drive current, and t is the time period over which such power was provided during the present cycle, such as represented by the value ONTIME generated at the step 122 of FIG. 4, as described. Accordingly, an accurate estimate of the temperature of the catalyzed surface 14 in the EHC may be made without requiring a temperature probe therein. Indeed, the sensor 30 applied to the catalytic converter may be deleted entirely using this temperature estimation approach, and the base temperature estimated using generally available sensor information, such as information from a conventional coolant temperature sensor (not shown) or from a conventional manifold air temperature sensor (not shown).

Returning to FIG. 4, the temperature Tehc, after being read or estimated at the step 126, is compared to a threshold temperature Tehc at a step 128, wherein Tehc is set to approximately 350 degrees Celsius in this embodiment. As described, Tehc is calibrated as a threshold the sensor 30 temperature must exceed to indicate adequate EHC temperature elevation. In one embodiment in accord with this invention, Tehc may be set substantially to the light-off temperature, on the order of 300–350 (?) degrees Celsius. If the sensor 30 (FIG. 1) is located very close to the catalyzed surface 14 such that it substantially indicates the surface temperature, and the surface must reach light-off in about fifteen seconds to elevate the converter temperature to light-off within a predetermined desired amount of time, such as 25 seconds, then Ktime should be set to about fifteen seconds. However, if the sensor 30 is located so as to indicate converter 18 temperature and not catalyzed surface 14 temperature, then Ktime may be set to about 25 seconds, and Tehc may be set to about 300–350 degrees Celsius.

Returning to FIG. 4, if Tehc exceeds Ktemp at the step 128, the heating performance at the present desired power level is adequate, and perhaps excessive, to meet predetermined heating performance goals, and the routine moves to clear counter FAILCNT, to remove any prior indicated failures at the current power level at a step 134, and then increments PASSCNT, a count of the number of consecutive passes or adequately powered EHC heating cycles at a step 136. FAILCNT and PASSCNT are stored in non-volatile controller memory (not shown).

Alternatively at the step 128, if Tehc is not greater than Ktemp, the present desired power level is assumed to be inadequate to meet predetermined heating performance goals, and the routine moves to indicate the inadequacy by clearing PASSCNT at a step 130, to remove any prior indication that the present power level is adequate, and then increments FAILCNT at a step 132, to count the failure along with any other consecutive failures at the present desired power level. Next, or after the described step 136, or if ONTIME is not yet greater than Ktime at the step 124 such that more heating time is required before the heating performance test of the present embodiment may be carried out, the routine moves to a step 138 to determine if the present heating cycle is complete. The heating cycle is complete when sufficient heating is provided through operation of the heating element 16 such that a self-sustaining exothermic reaction is taking place in the catalyzed surface 14 or in the converter 18 itself, to allow a rapid temperature elevation to light-off in the converter. This sufficient heating may be assumed to be present when the sensor 30 reaches a predetermined temperature, such as the light-off temperature, or after a predetermined time period of operation of the heating element 16, such as 10–15 seconds. If the heating cycle is assumed to be complete at the step 138, the routine moves to disable the interrupt serviced by the routine of FIG. 4 at a step 140, to prevent further catalytic converter heating operations, for example to avoid unnecessary consumption of power in the system. Next, the desired power level applied to the heating element 16 is set to zero at a step 142, and is output at a step 144, such as to the power switch 28 (FIG. 1). In the embodiment of this invention in which alternator power is used to drive the heating element 16, the powertrain controller 26 may output the signal SEL in a state interpreted by the control circuit 36 as a command to disconnect alternator output voltage Va from the EHC, which may be carried out at one of the steps 142 or 144. After the step 144, or if the heating cycle was not determined to be complete at the step 138, the routine returns to any powertrain controller operations that may have been interrupted by the interrupt service operations of the routine of FIG. 4, such as the described background operations of step 66 of FIG. 2.

The manner in which the heating performance of the EHC, which includes the heating element 16 and the catalyzed surface 14 is analyzed through the described embodiment is but one approach to analyzing the sufficiency of the desired power level of the heating element. The inventors merely intend that the invention provide for a repetitive analysis of how well a predetermined constraint of time to catalyst light-off is provided for, and for providing the minimum amount of power needed to the EHC to operate within that time constraint. For example, tailpipe emissions may be measured during a engine start-up period using conventional emissions measuring equipment. The significant drop in levels of certain of such emissions may be used as an indication of catalytic converter light-off instead of the temperature measuring approach of the above-described embodiment, and adjustment to desired power level made in response thereto. More sophisticated approaches may be made to the analysis of passing and failing heating performance than that of the above embodiment, such as more rigorous statistical evaluation approaches. Rather than simply look for a number of consecutive passes or fails, and adjusting desired power level in response thereto, while discarding certain pieces of information, a comparison of the number of passes to the number of fails at a fixed power level may be made within the scope of this invention, and adjustments made in response to the comparison, without loss of data. A variety of other approaches may be made after a reading of the teachings of this disclosure within the scope of this invention, through the practice of ordinary skill in the art. The inventors list the above embodiments merely as preferred examples of the many working embodiments that the present invention may take, and in no way intend to limit the scope of this invention by those examples.

The embodiments of the invention in which a property or privilege is claimed are described as follows:

1. A method for controlling heat energy delivered by an electrical heater to internal combustion engine exhaust gas, comprising for each of a series of engine coldstart events, the steps of:

referencing a preserved desired power level at which to operate the heater;

operating the heater at the desired power level;

estimating the performance of the heater in delivering heat energy to the engine exhaust gas at an end of a predetermined heating period;

determining when the performance is unsatisfactory;

increasing the desired power level when the performance is determined to be unsatisfactory; and preserving the increased desired power level.

2. The method of claim 1, further comprising the steps of:

determining when the performance is satisfactory;

decreasing the desired power level when the performance is determined to be satisfactory; and preserving the decreased desired power level.

3. The method of claim 1, further comprising the step of limiting the desired power level to a predetermined limit value.

4. The method of claim 1, wherein the estimating step further comprises the step of sensing temperature at a predetermined location in an engine exhaust gas path.

5. The method of claim 1, wherein the determining step further comprises the steps of:

comparing the estimated performance to a predetermined performance threshold value; and determining the performance to be unsatisfactory when the estimated performance is less than the predetermined performance threshold value.

6. The method of claim 1, wherein the estimating step further comprises the step of sensing temperature at a predetermined location in an engine exhaust gas path, and wherein the determining step further comprises the steps of (a) comparing the sensed temperature to a predetermined temperature threshold value, and (b) determining the performance to be unsatisfactory when the sensed temperature is less than the predetermined temperature threshold value.

7. The method of claim 2, wherein the estimating step further comprises the step of sensing temperature at a predetermined location in an engine exhaust gas path.

8. The method of claim 2, wherein the determining step further comprises the steps of:

comparing the estimated performance to a predetermined performance threshold value; and determining the performance to be satisfactory when the estimated performance is greater than the predetermined performance threshold value.

9. The method of claim 2, wherein the estimating step further comprises the step of sensing temperature at a predetermined location in an engine exhaust gas path, and wherein the determining step further comprises the steps of (a) comparing the sensed temperature to a predetermined temperature threshold value, and (b) determining the performance to be satisfactory when the sensed temperature is greater than the predetermined temperature threshold value.

10. A method of controlling operation of an electrical heater for contributing heat energy to internal combustion engine exhaust gas, comprising the steps of:

sensing a predetermined coldstart event;

selecting a stored heater command;

operating the electrical heater in accord with the selected command;

monitoring the performance of the heater in contributing heat energy to the internal combustion engine exhaust gas;

determining when the performance does not meet a predetermined performance threshold; and increasing the stored heater command by a predetermined increase amount when the performance does not meet the predetermined performance threshold.

11. The method of claim 10, further comprising the steps of:

determining when the performance exceeds the predetermined performance threshold; and decreasing the stored heater command by a predetermined decrease amount when the performance exceeds the predetermined performance threshold.

12. The method of claim 10, further comprising the steps of:

estimating the amount by which the performance does not meet the predetermined performance threshold when the performance is determined to not meet the performance threshold; and adjusting the increase amount as a predetermined function of the estimated amount.

13. The method of claim 11, further comprising the steps of:

estimating the amount by which the performance exceeds the predetermined performance threshold when the performance is determined to exceed the performance threshold; and adjusting the decrease amount as a predetermined function of the estimated amount.

* * * * *